United States Patent
Le et al.

(10) Patent No.: US 12,345,823 B2
(45) Date of Patent: Jul. 1, 2025

(54) REPEATING GROUND TRACK OPTIMIZATION

(71) Applicant: SpinLaunch Inc., Long Beach, CA (US)

(72) Inventors: Ninh Le, Huntington Beach, CA (US); Jennifer Pouplin, Colorado Springs, CO (US); Martin Greenwood, Irvine, CA (US)

(73) Assignee: SpinLaunch Inc., Long Beach, CA (US)

( * ) Notice: Subject to any disclaimer, the term of this patent is extended or adjusted under 35 U.S.C. 154(b) by 343 days.

(21) Appl. No.: 18/072,411

(22) Filed: Nov. 30, 2022

(65) Prior Publication Data

US 2024/0176029 A1    May 30, 2024

(51) Int. Cl.
*H04B 7/185* (2006.01)
*G01S 19/25* (2010.01)
*G01S 19/40* (2010.01)

(52) U.S. Cl.
CPC .......... *G01S 19/258* (2013.01); *G01S 19/252* (2013.01); *G01S 19/40* (2013.01)

(58) Field of Classification Search
CPC ...... G01S 19/258; G01S 19/252; G01S 19/40; B64G 1/1007; B64G 1/1085; B64G 1/242; H04B 7/18521; H04B 7/19; H04B 7/195
See application file for complete search history.

(56) References Cited

U.S. PATENT DOCUMENTS

| | | | |
|---|---|---|---|
| 6,556,808 B1 | 4/2003 | De La Chapelle et al. | |
| 9,344,182 B2* | 5/2016 | Bigras | H04B 7/195 |
| 10,637,562 B1* | 4/2020 | Cleave | H04B 7/18523 |
| 10,674,417 B2* | 6/2020 | Choquette | H04B 7/18528 |
| 11,075,691 B2* | 7/2021 | Loheit | H04B 7/19 |
| 2019/0341998 A1* | 11/2019 | Vaughan | H04B 7/18584 |
| 2020/0029265 A1 | 1/2020 | Choquette | |
| 2020/0382206 A1 | 12/2020 | Adams et al. | |
| 2021/0391921 A1* | 12/2021 | Cooke | H04B 7/18541 |
| 2022/0135255 A1* | 5/2022 | Langill | B64G 1/1021 |
| | | | 244/158.4 |
| 2023/0358896 A1* | 11/2023 | Quintero | G01S 19/258 |

(Continued)

FOREIGN PATENT DOCUMENTS

| | | |
|---|---|---|
| WO | WO2000041341 A1 | 7/2000 |
| WO | WO2016113586 A1 | 7/2016 |

OTHER PUBLICATIONS

Eshagh et al., "Perturbations in orbital elements of a low earth orbiting satellite," Journal of the Earth & Space Physics. vol. 33, No. 1, Feb. 2007, p. 1-12.

*Primary Examiner* — Dhaval V Patel

(74) *Attorney, Agent, or Firm* — Carr & Ferrell LLP

(57) ABSTRACT

Methods and systems for providing voice, video, or data services using optimized ground track satellites and ground tracking antennas are disclosed herein. An example system includes first satellites in a first constellation, the first satellites having a first fixed ground track relative to Earth's surface, and an antenna being located at a location on the first fixed ground track, the antenna being configured to steer in a single axis to track the first satellites, wherein each of the first satellites reach the location, after an integer number of days that include a period of two or more sidereal days with an adjustment to account for nodal precession of the first satellites.

19 Claims, 7 Drawing Sheets

(56) References Cited

U.S. PATENT DOCUMENTS

| | | | |
|---|---|---|---|
| 2024/0176029 A1* | 5/2024 | Le | B64G 1/1007 |
| 2024/0308696 A1* | 9/2024 | Mukae | F41H 11/02 |
| 2024/0333379 A1* | 10/2024 | Mukae | H04B 7/19 |

* cited by examiner

```python
import numpy as np
# SI units throughout
class Orbit:
    Re = 6371e3 # Radius of Earth,
    DAY_LENGTH = 86164  # sidereal day length
    G = 6.6743e-11 # Gravitational constant
    M = 5.97219e24 # Mass of Earth
    MU = G * M
    J2 = 1.0827e-3 #J2 geopotential term def precession_rate(self, e, a, inclination, period):  # calculate rate of nodal precession
        i = inclination * np.pi / 180
        n0 = 2 * np.pi / period
        A = self.Re**2 / ( a**2 * (1 - e**2)**2)
        domega_dt = -(3/2) * n0 * A * self.J2 * np.cos(i)
        return domega_dt def base_orbit_calc(self, desired_period):
        T = desired_period
        a = (self.MU * (T/2/np.pi)**2)** (1/3)
        return a def __init__(self, orbits, days, inclination):
        starting_period = self.DAY_LENGTH / orbits * days
        desired_period = starting_period
        e = 0 # nominally circular orbit
        for _ in range(5):
            a  = self.base_orbit_calc(desired_period) # calculate semi-major axis
            domega_dt = self.precession_rate(e, a, inclination, desired_period)
            precession_per_orbit = domega_dt * desired_period
            adjustment = precession_per_orbit / (2 * np.pi) * orbits / days
            desired_period = starting_period * (1 + adjustment)
            print("Orbital height, km", (a - self.Re) / 1000)

if __name__ == "__main__":
    number_of_orbits = 43
    number_of_days = 3
    inclination = 55 # degrees
    Orbit(number_of_orbits, number_of_days, inclination)
```

FIG. 4

REPEATING GROUND TRACK OPTIMIZATION

FIELD OF THE DISCLOSURE

The present disclosure pertains to satellite communications systems. More specifically, the present disclosure relates to methods and systems for providing voice, video, or data services.

SUMMARY

In one example embodiment, the present disclosure can include a system comprising: first satellites in a first constellation, the first satellites having a fixed ground track relative to the Earth's surface, and a set of VSATs (very small aperture terminals) that can track, each by steering in a single axis, and each communicating with one or more of the satellites as they pass along the apparent path in the sky that is overhead the satellites' fixed ground track, wherein the satellites' constellation has been designed to cause the satellites to follow, one after the other, the same apparent path in the sky, relative to the Earth's frame of reference, with suitable compensation and adjustments to account for major orbital perturbations, the most significant of which is the J2 term that results from the oblate form of the solid body of the Earth.

In one example embodiment, the present disclosure can include a system that comprises first satellites in a first constellation, the first satellites each having a first fixed ground track relative to Earth's surface, wherein an orbit of the first satellites having been determined such that the first fixed ground track remains fixed relative to a surface of Earth, taking account of J2-induced nodal precession, the orbit of the first satellites taking the form of integer n orbits reaching a same nadir point over the surface of the Earth after integer m rotations of Earth; and a VSAT having an antenna in a location designated by a service operator as being in a service region, wherein a segment of sky track that corresponds to an orbital trajectory that is above the first fixed ground track is visible, the antenna being configured to steer in a single axis to track the first satellites as they move along the segment of the sky track.

BRIEF DESCRIPTION OF THE DRAWINGS

FIG. 4 illustrates example code or instructions that can be used to adjust the orbital height (more specifically, the semi-major axis of a near-circular orbit) based on the numerical ratios that define an arbitrary repeating ground track constellation.

DETAILED DESCRIPTION

Overview

Figure 1:
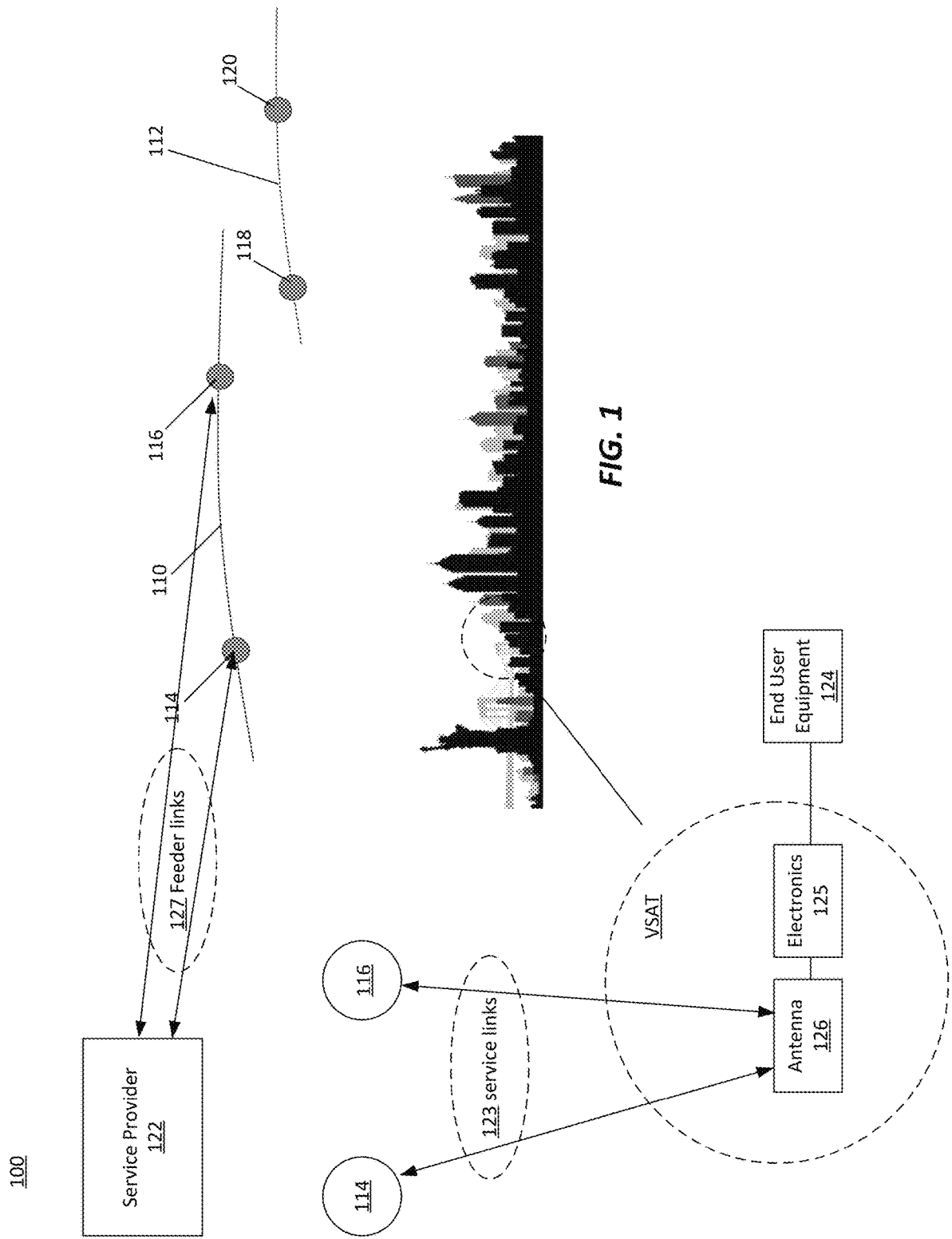
FIG. 1 illustrates a service provider offering terrestrial data services from one of the two satellite ground tracks, according to various embodiments of the present technology.
Figure 2:
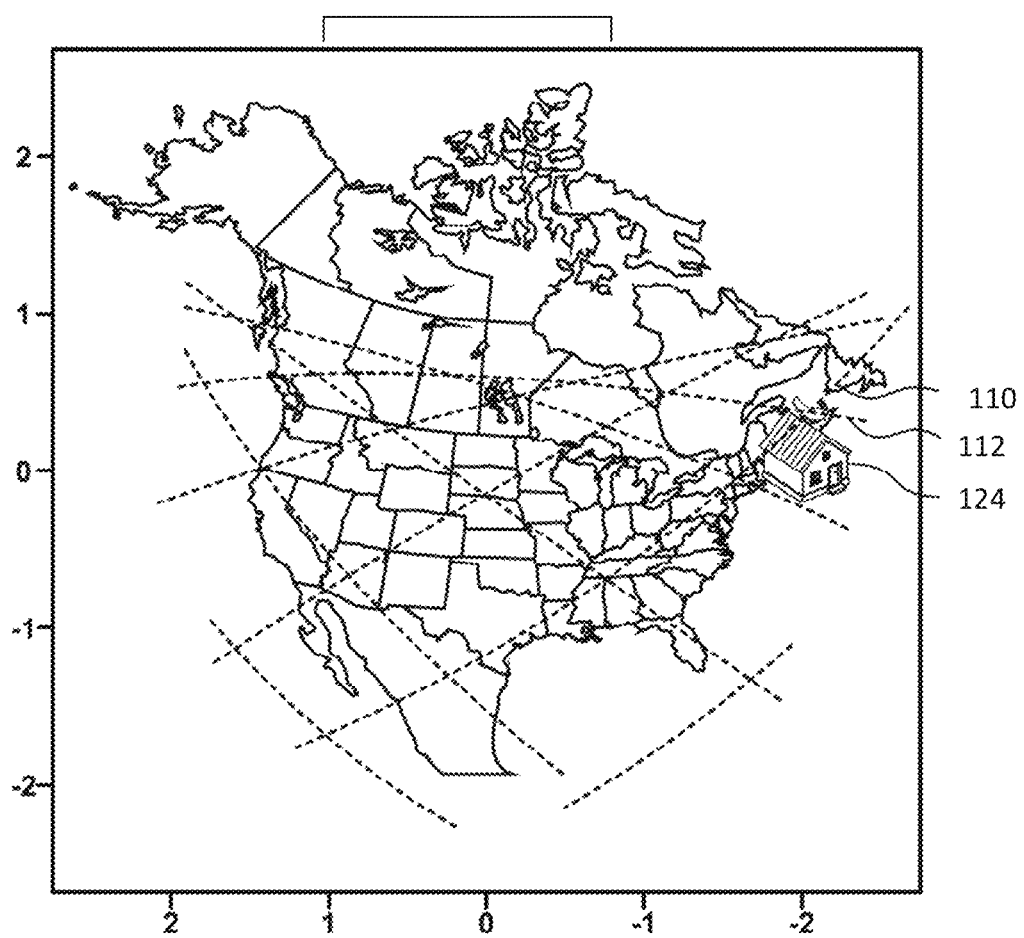
FIG. 2 illustrates continuous repeating ground tracks, according to various embodiments of the present technology.

For context, geostationary orbiting (GEO) satellites, operated in conjunction with VSATs (very small aperture terminal), are well established and have been in operation for decades. They serve many purposes, such as data communications, television (TV) broadcast and TV distribution. The GEO satellite appears, by definition, at a fixed location in the sky as seen from a point on the Earth's surface. Consequently, a ground-fixed VSAT designed to operate with a GEO satellite is a simple and inexpensive item that needs only to be pointed once, upon installation, and remains fixed thereafter.

Recent years have seen a surge of investment in and deployment of medium Earth orbit (MEO) and low Earth orbit (LEO) satellite systems. There are many reasons for this, including lower launch costs, reductions in the cost of electronics, and higher demand for remote data services. However, satellites in these non-GEO orbits show apparent motion in the sky, with dwell times typically in the region of seconds to minutes in a given pointing direction. Their corresponding VSATs require the ability to track dynamically the satellites' motion as well as manage a "soft" (make before break) handoff between one satellite and another.

Currently deployed LEO satellite communications networks require the VSATs to have the capability of pointing anywhere within a large overhead solid angle. This is a consequence of the design of the orbital constellations that have satellites making passes overhead along a multitude of different apparent paths in the sky as seen from a given fixed ground location.

In various embodiments, the present technology results in LEO satellites or MEO satellites of a given constellation moving along predefined paths (relative to the surface of the Earth) having repeating ground tracks, known as a "flower constellation", so that the terrestrial VSAT may be constrained to operate within a single plane that is closely aligned with a particular segment of the apparent path in the sky that is associated with the repeating ground track. While there is some cost associated with establishing and maintaining the repeating ground tracks, the cost of the VSAT is substantially reduced when the terrestrial VSAT is constrained to operate within that single plane.

VSATs that connect with GEO satellites have been in service for many years. The connection between VSATs and GEO satellites is a simple, static arrangement in which the VSAT is pointed at the GEO satellite permitting bidirectional radio communication. For mobile applications, such as ships and aircraft, the connection between VSATs and GEO satellites is modified to allow the VSAT's antenna to steer as the mobile platform changes location or attitude, is the steering being typically accomplished with some mechanical arrangement or, increasingly, with an electronically steered array.

The advent of LEO satellites in traditional VSAT applications forces a shift towards electronically steered arrays for two reasons. Firstly, there is an apparent motion of the LEO satellites across the sky as LEO satellites move with respect to the earth and, therefore, must be tracked. Secondly, and more importantly, each LEO satellite remains in view for only a few minutes, and satellite-to-satellite handoffs are frequent. This normally dictates a "soft" or make-before-break transition, requiring at least two beams to be made simultaneously, which is easier to do using an electronically steered array operating in two dimensions rather than a mechanical antenna.

Electronically steered, phased array antennas normally require a two-dimensional array of antenna elements, to permit steering simultaneously and independently in azimuth and elevation. There are many array elements (e.g., a thousand array elements), each of which requires active components—notably for phase shifting. A large number of active components makes the cost of the assembly high, many times that of a simple fixed VSAT that would use a pressed metal antenna.

The present disclosure pertains to systems and methods that apply repeating ground track trajectories to LEO and MEO constellations thereby enabling substantial cost reduction of the associated VSATs that may thus have their requirement for tracking capability reduced from fully dual-axis to substantially single-axis, as well as taking account of orbital precession, using link bonding, allowing constellations whose repeat period is multiple days instead of a single day, using opposite polarizations for northbound and southbound directions and communicating with VSATs by way of spot beams.

While some examples of repeating ground track satellite constellations and one-dimensional antennas have been used, these configurations are inadequate because they do not take into account orbital precession. Thus, these arrangements are not practically implementable other than by using either an equatorial or a polar orbit, a constraint that would not permit the increased coverage efficiency and flexibility that would be available from an orbit having some other inclination.

The embodiments disclosed herein enable communications systems that track and communicate with a multiplicity of satellites simultaneously from a given VSAT (using link bonding) and permit constellations whose repeat period can be approximately multiple sidereal days, as opposed to a single sidereal day. These communications systems can use the polarization of a radio link to avoid interference between northbound and southbound satellites and for the satellite to present an array of spot beams to maximize the available capacity from the network.

Advantageously, the communications systems disclosed herein can utilize the combination of repeating ground tracks and single-degree-of-freedom VSATs in a manner that is flexible and efficient. Without the multiple-day feature, the number of possible orbital heights is severely restricted. Without taking precession into account, it would be impossible to choose an orbit of arbitrary inclination or altitude and therefore one would be unable to optimize launch costs by matching the final inclination or altitude to the inclination or altitude of the parking orbit and/or to avoid wasting resources by creating orbits that place substantial amounts of resource over the North and South Poles. The added efficiency comes from the VSAT being able to connect to multiple satellites simultaneously, allowing for load balancing, throughput optimization, interference avoidance and working around forbidden directions of transmission (such as to avoid interfering with a GEO satellite) while maintaining the quality of service. The use of opposite polarizations for northbound and southbound satellites is essential in eliminating interference in the constellation (of any design, except for the exceptionally limited case of a polar orbit that has a repeat pattern with an odd number of orbits). The use of multiple spot beams, having associated frequency reuse and being subject to power saving, is essential in creating a service constellation of practical utility.

In some embodiments, the communications systems can be optimized by accounting for what is referred to generally as J2 perturbations. While J2 perturbations will be discussed at length herein, it will be understood that the methods disclosed can be adapted to take into account other perturbations that would be known to one of ordinary skill in the art with the present disclosure before them.

In some embodiments, the precession of the longitude of the ascending node of the orbits due to the J2 perturbation is significant and must, in practice, be taken into account in the calculation of the required orbit height. For example, a satellite orbit having a 14-orbit repeat over a single sidereal day needs to be at a height of 887 km. The same 14 orbits per single day repeat, but now at the lower inclination of 55 degrees, needs to be at a height of 838 km. This is a substantial difference; a constellation launched with an error in orbital height of 49 km would surely fail, in terms of service coverage and mission planning. The example inclination of 55 degrees is typical of many LEO systems, and other inclinations such as 45 degrees (required height: 826 km) are also typically used. Such non-polar orbits are preferred because the constellation is not wasting its resources overflying the sparsely populated polar regions and the dwell time over well-populated latitudes is increased.

A method of calculation of the orbit can include determining at least the most major perturbation is required and is set forth infra. An implicit assumption made in existing systems is that a VSAT would be in communication with a single satellite. In practice, it is essential (as a bare minimum) for the VSAT to communicate with two satellites simultaneously to create a "soft" handover and it is highly desirable for the VSAT to communicate with a multiplicity of satellites simultaneously, for reasons that will be discussed in further detail herein. Third, whereas the number of orbits during a single rotation of the Earth, of any given satellite, may be an integer, greater flexibility in the required orbital height and location of the satellite tracks is achieved if an integer number of orbits is related to a multiple, integer number of days (so that as well as ratios such as 14:1 and 15:1 we now add 43:3, 44:3, and 46:3, and even 57:4 for example) while noting that the "integer" number of days described in fact deviates slightly from the count of sideral days because of the orbital precession (this deviation is treated in more precise detail in the context of the mathematical derivation that is presented herein where it will be explained more accurately what these integer ratios represent and how they are used).

Additionally, polarization between northbound and southbound sweeps of the satellite should be opposite so that they do not interfere with one another at the crossover points.

Some embodiments provide advantages based on antenna patterns or coverage. The ability of a given satellite to present a multiplicity of "spot beams" to the Earth's surface enables the satellite to present large amounts of bandwidth to large numbers of VSATs. Given that the cost of the VSAT terminal is one of the primary drivers for the adoption of this type of system, existing systems cannot address how large numbers of VSATs might be served.

Example Embodiments

FIG. 1 illustrates a service provider offering terrestrial data services from one of the two satellite ground tracks, according to various embodiments of the present technology. FIG. 1 includes a diagram 100 of track segments in the sky that are overhead continuous, repeating ground tracks, according to various embodiments of the present technology.

In some embodiments, a period and the orbit of each of the first constellation are precalculated to produce the first segment of track and the second segment of track that are visible in the sky based on a J2 geopotential term and nodal precession in order to position the segments of track fixed relative to the Earth.

Two sky track segments, 110 and 112 are visible in the sky. In the present case, they are both located overhead different parts of the same repeating ground track, which in turn is associated with a single repeating ground track constellation. The ground track is stationary with respect to the Earth and the two sky track segments are thus stationary in space, appearing static from the point of view of an observer at a fixed ground location. At the moment in time in question, sky track segment 110 bears two satellites, 114 and 116, moving along sky track segment 110, while sky track segment 112 bears two satellites 118 and 120 moving along sky track segment 112.

Because the ground track is single and continuous, then at different times, satellites 114 and 116 will appear on sky track segment 112 and satellites 118 and 120 will appear on sky track segment 110. The satellites that are visible number in this example include a total of four and this is out of a total count for the constellation of several hundred. The satellite spacing is nominally constant and they travel one after another so that as one satellite disappears from view, another appears so that some minimum number of satellites remains in view on each of the sky track segments 110 and 112.

The two sky track segments have satellites heading in different directions. Sky track segment 110 has its satellites' motion in a generally southeasterly direction, while sky track 112 has its satellites' motion in a generally northeasterly direction. For the satellites to avoid interfering with one another at or close to the crossover point, the satellites on sky track segment 110 have their forward downlink right-hand circular polarized, while the satellites on sky track segment 112 have their forward downlink left-hand circular polarized. For any given satellite the return uplink communication is given the opposite polarization to the forward downlink.

The satellites 114 and 116 can communicate with a service provider 122 over feeder links 127. This allows the service provider 122 to transmit commands to the satellites, for example, to instruct the satellites to change their trajectory (or other similar instructions). The satellites can also transmit operational data to the service provider 122.

In some embodiments, an end-user equipment 124 can receive satellite communications using VSAT that includes antenna 126 and electronics 125, and can communicate with satellites 114 and 116 over service links 123. As noted throughout, this antenna 126 tracks satellites along a single plane or axis. That is, antenna 126 is aligned with a single sky track segment of a satellite constellation. The antenna 126 can communicate with the subset of satellites in the constellation (such as 114 and 116) that are, at that time, traveling along a specific, visible, sky track segment (such as 110).

The configuration shown in FIG. 1 allows for fourteen orbits in one sidereal day, with some allowance for precession. For example, similar configurations are also possible, such as forty-four orbits in three days, or for example, MEO constellations with eight orbits in one day. These types of constellations are called "flower constellations" but for clarity are described here as having "repeating ground tracks". In various embodiments, a satellite ground track may be defined as a path along the Earth's surface that traces the movement of an imaginary line between the satellite and the center of the Earth (the locus of the satellite's nadir) and after some length of time, the nadir starts to trace along the track that it has already made. In the Earth's rotating reference frame, all the satellites follow the same closed-loop trajectory (repeated space tracks). To obtain an even distribution of satellites, each satellite needs to lie in its orbital plane (now in the inertial frame of reference) with an equal angular separation of the ascending nodes of the orbital planes, and the phase of the satellites (mean anomaly) set so that they share the same path in space when viewed in the rotating Earth-relative reference frame.

In various embodiments, the purpose of the repeating ground track constellation is to allow the VSAT antenna to be aligned statically with a single sky track segment. When aligned (manually or automatically and usually on initial installation) the VSAT will track the satellites that are in motion along that sky track segment. For example, the antenna 126 might feasibly be aligned with either sky track segment 110 or sky track segment 112. If it were aligned with sky track segment 110, it would be able to track (simultaneously) satellites 114 and 116. Conversely, if aligned with sky track segment 112 it would be able to track satellites 118 and 120.

Once the VSAT antenna 126 has been aligned with sky track segment 110, the alignment remains fixed and it is able to track only those satellites that move along sky track segment 110. As illustrated, the VSAT antenna 126 tracks satellites 114 and 116. After a short while, satellite 114 will have moved out of the view of the VSAT antenna, satellite 116 will have moved some distance to the left as viewed in the illustration, and a new satellite will have appeared at the right-hand end of the sky track segment 110. The antenna maintains a connection with (in this case) the two satellites that are on the sky track segment 110 at any given time, even as they appear at one end and disappear at the other. The constellation may be designed so that the number of satellites that is continuously visible might be three, rather than two, or fixed at some other number. Thus, with these continuous simultaneous satellite connections, the VSAT as a whole is able to maintain a multiplicity of communications links that are combined by the link bonding process.

In various embodiments, the antenna 126 needs to target (i.e., track) a single line across the sky and does not need to dynamically access multiple points within a large solid angle. Furthermore, with an appropriate choice of orbit and coverage zones, the apparent motion of the satellites may be constrained to within two degrees of a straight line from the point of view of the VSAT. This means that the VSAT may be constructed to essentially become a linear array, rather than a two-dimensional array.

With regard to the establishment of the correct orbital height for an example LEO satellite, then if the orbit is inclined and prograde, the precession of the orbital node will be in a westerly direction. This has the effect of shortening the required orbital period over which the ground track will repeat and therefore reducing the required orbital height. An iterative calculation is utilized. The required math is set forth in more detail below.

As noted above, the effect of the Earth's oblateness, quantified by the "J2 term", causes orbital perturbations, one of which is the precession of the orbital plane, also known as "nodal precession". (Non-circular orbits also suffer changes in the argument of perigee and shifting of the mean anomaly, but these effects are not pertinent to orbital height).

To create a repeating ground track orbit, the nodal precession must be taken into account and the consequence is that a significant difference in orbital height is needed. The precession necessitates a downward adjustment in orbital height by several tens of kilometers, depending on the precise orbit, a difference that needs to be taken into account in any realistic constellation design. There is a multitude of other geopotential perturbing factors, but these are smaller than J2 by orders of magnitude and may be ignored at the design phase—although they are relevant and important in detailed trajectory prediction and tracking, along with other factors such as atmospheric drag (depending on altitude), solar radiation pressure, and lunar and solar tidal forces.

The orbital height can be calculated by initially considering a single satellite, orbiting in a fixed (unperturbed) inertial plane. As the Earth rotates, the ascending node where the satellite crosses the equatorial plane in a northerly direction, relative to the Earth, will successively shift in longitude westwards, by a fixed amount upon each orbit. In the simplest case, if that ascending node were to shift by an integer fraction n of 360 degrees, then after n orbits the satellite would be in the same longitude relative to the Earth as when it started and the ground track would then repeat.

In some embodiments, an algorithm can be implemented to account for the J2 term mentioned above. This can include calculating the longitudinal rotation of Earth after a certain period of time for a satellite of the present disclosure. The algorithm to compute the longitudinal rotation $\Delta L_1$ can include an equation set forth below:

$$\Delta L_1 = 2\pi \frac{T}{T_E}$$

where T is the time elapsed and $T_E$ is the time for completing a full revolution relative to a sidereal day. It will be understood that a sidereal day is 0.99727 calendar days. An equation can also be implemented to calculate the effect of nodal progression $\Delta L_2$ as set forth below:

$$\Delta L_2 = \frac{-3\pi J_2 Re^2 \cos(i)}{a^2(1-e^2)^2}$$

where $J_2 \cong 0.00108263$, $R_e$ is the equatorial radius, i is the orbital inclination, a is the orbital semimajor axis, and e is the orbit eccentricity. In order to finally determine J2, the algorithm includes the following simplification:

$$j|\Delta L_1 + \Delta L_2| = j\left|-2\pi\frac{\frac{2\pi\sqrt{a^3}}{M}}{T_E} - \frac{-3\pi J_2 Re^2 \cos(i)}{a^2(1-e^2)^2}\right| = K*2\pi$$

which results in the following equivalency:

$$j|\Delta L_1 + \Delta L_2| = K*2\pi$$

where j is the number of orbital revolutions after which the same ground track has been covered, M is the Mean Anomaly, and K is the number of sidereal days after which the same ground track has been covered. Thus, the algorithm is expressed as a function of both the number of orbital revolutions and the number of sidereal days which are used to determine that a ground track has been covered by a satellite of the present disclosure. It will be understood that the equivalency must hold for a repeating ground track for a satellite of the present disclosure.

Additionally, consider the longitude of a satellite (that is, in the Earth-fixed reference frame) at the point where it crosses the equatorial plane in a northbound direction. Let $\Omega_P$=Angle of rotation of satellite position due to precession, per orbit; let $\Omega_E$=Angle of rotation of satellite position due to the rotation of the Earth, per orbit; and let $T_S$=Orbital period of the satellite.

The condition for a ground track repeat is that the position (relative to the Earth) must repeat after some number of orbits:

$$\Omega_P + \Omega_E = \frac{2\pi m}{n}$$

where n is the integer number of orbits and m is the integer number of times the crossing point (Node) wraps around before the repeat.

$$\Omega_P = \dot{\Omega}_P T_S$$

The standard formula for nodal precession is:

$$\dot{\Omega}_P = -\frac{3}{2}n_0 A J_2 \cos i T_S = \frac{2\pi}{n_0}$$

and therefore, $$\Omega_P = -\frac{3}{2}n_0 A J_2 \cos i \frac{2\pi}{n_0} = -3\pi A J_2 \cos i$$

where $n_0 = \sqrt{\mu/a^3}$ is the mean motion of the satellite, $$A = \left(\frac{R_E}{a(1-e^2)}\right)^2,$$

$J_2$ is the second order geopotential coefficient, $R_E$ is the radius of the Earth, a is the semi-major axis length, e is the eccentricity and i is the inclination of the orbital plane. $\Omega_E$ is simply found as a ratio of the orbital period $T_S$ to the Earth's rotation period $T_E$, as:

$$\Omega_E = -2\pi\frac{T_S}{T_E}$$

Substituting into (1):

$$-3\pi A J_2 \cos i - 2\pi\frac{T_S}{T_E} = \frac{2\pi m}{n}$$

where m and n can only be positive integers, so by replacing the convention "East positive" with "West positive," and simplifying, we have:

$$\frac{3}{2}A J_2 \cos i + \frac{T_S}{T_E} = \frac{m}{n}$$

The use of this equation allows an adjusted value for $T_S$ to be found that satisfies the integer m/n condition and this results in the significant adjustment in orbital height that has been discussed, which is needed for a true repeating ground track orbit.

It should be noted that a finer adjustment may be applied to account for two other precession effects, the change in the Mean Anomaly (M) and the change in the Argument of Perigee ($\omega$). Altogether, the period of the satellite, $$T_S = \frac{2\pi}{\left(\frac{dM}{dt} + \frac{d\omega}{dt}\right)}$$

and the two varying terms are given by the standard formulae $$\frac{dM}{dt} = n_0\left[1 + \frac{3}{4}A(1-e)^{\frac{1}{2}}J_2(3\cos^2 i - 1)\right]$$

and $$\frac{d\omega}{dt} = \frac{3}{4}AJ_2(5\cos^2 i - 1)$$

The adjustment in orbital height needed to correct for the nodal precession exceeds by more than an order of magnitude the effect of the two smaller terms, and in the sample Python program and the discussion generally, nodal precession is treated as the principal perturbation that needs to be considered for purposes of constellation system design.

In some embodiments, a repeating ground track can be defined as a pair of integers. In some embodiments, the ratio of the orbital period to sidereal day length is not a ratio between an integer and one nor is it even a ratio of two integers, as noted above.

The entire constellation of satellites is continuously rotating due to precession, in the opposite direction to the Earth's rotation, and while the condition of "repeating ground tracks" is achieved, it is certainly not a result of an "integer number of orbits during a single 360-degree rotation of the Earth"; however, this is a simplification.

Despite this, it is convenient to define the repeating ground track constellation as a ratio of two integers, where the first is the count of orbital rotations and the second is the count of the number of times the Earth rotates by 360 degrees (sidereal day) minus the angle through which the constellation precesses.

Thus, repeating ground track constellations of the present disclosure produce a repeating ground track formed not only after a single day but after an integer number of days. As the number of days in the pattern definition is increased, the ground tracks become closer together. Depending on the desired ground coverage, this may be exactly what is desired, although for repeating patterns with, say, five- or six-day repeats, the ground tracks may end up closer than needed. Table 1 below shows examples of repeat patterns with up to three-day repeats, and it can readily be seen that the introduction of the multi-day repeat greatly increases the flexibility of orbital design by allowing a greater choice of orbital heights:

TABLE 1

| Orbits | Days | Height/km |
|--------|------|-----------|
| 31 | 2 | 352 |
| 46 | 3 | 402 |
| 15 | 1 | 505 |
| 44 | 3 | 612 |
| 29 | 2 | 667 |
| 43 | 3 | 723 |
| 14 | 1 | 838 |

The heights in Table 1 have been calculated so as to include the effect of the J2 perturbation, and all are given for an orbital inclination of 55 degrees and an eccentricity of 0, although it will be understood that other angles or eccentricity can be used.

In some embodiments, multiple repeating ground track constellations are overlaid, which sets the ground tracks closer together. For example, if it is desired to design a constellation for a height of 500 km, one might choose the option of having 15 orbits in one day, with a height of 505 km. Because there are 15 orbits in the pattern, there will be 15 northbound nodal crossings spread equally around the equator. This places the crossings 360/15=24 degrees apart in longitude (on the ground), which would be 2,000 km on the ground. Such separation would result in incomplete coverage. In these circumstances, a second repeating ground track constellation could be arranged so that the northbound nodal crossings of the second constellation are interleaved with those of the first, and the equatorial track separation (see S1 of FIG. 1) could thereby be reduced to 1,000 km for the two constellations combined. Indeed, it may be desirable to make the interleaving asymmetrical, for example with separations that are alternately 800 km and 1,200 km, possibly for purposes of maximizing coverage of certain regions.

FIG. 4 illustrates an example Python code for the correct calculation of orbital height (more specifically, the semi-major axis of a near-circular orbit) based on the numerical ratios that define an arbitrary repeating ground track constellation, applying the J2 geopotential term, and ignoring the smaller geopotential adjustments and other sources of perturbation.

As noted above, the communications systems disclosed herein can utilize antenna polarization to reduce interference. It will be understood that a posigrade orbit of nonzero inclination puts satellites into a motion where they travel more-or-less northeast going from the southerly extreme of the orbit, crossing the Equatorial Plane in a northerly sense, and continuing to the northerly extreme of the orbit. Conversely, those that are going from the northerly extreme of the orbit towards its southerly extreme travel more-or-less southeast. The two sets of passes, northbound and southbound, intersect in a crisscross pattern over the coverage area.

How the VSAT follows satellites along a particular track across the sky means that it is quite likely that somewhere along that track lies one of the intersections from the crisscross pattern. At the crossover point, the VSAT is vulnerable to interference from, or potentially may interfere with, a satellite of the same constellation, traveling in the other direction (e.g., northbound as opposed to southbound) compared to the ones that the VSAT is trying to communicate with.

For regulatory reasons, the northbound and the southbound satellites are likely to use the same frequency bands—indeed, this is desirable for the sake of spectral efficiency. The most efficient means to separate the communications of the northbound and the southbound satellites is to have them use opposite polarizations. For example, a VSAT tracking northbound satellites might be using right-hand circular polarization, while there might be another VSAT, tracking southbound satellites, in close proximity, that is using left-hand circular polarization. The preferred way to configure this is to use circular polarization and apply it to both uplink and downlink (on the service side of the satellite). Linear polarization can be used but would need to be aligned north-south or east-west to maintain orthogonality between the two and this would place additional constraints on the orientation of the satellite or require it to control the skew of its communication signals.

In addition to polarization, the communications systems herein can be optimized by providing link bonding, which allows soft handoffs between satellites to reduce and/or eliminate gaps in transmission with the VSAT. Considering that the satellites follow one after another along the same track in the sky (as seen from the ground), the VSAT may be constructed to have a tracking capability that is essentially one-dimensional. Link bonding can be applied in the communications between the VSAT and multiple satellites simultaneously.

To provide link bonding, there should be a sufficient number of satellites in the constellation that at any moment in time, at least two (and preferably more) are within a segment of a track in the sky with which the VSAT is aligned. In some embodiments, the VSAT is capable of communicating simultaneously with multiple satellites and can support link bonding. Additionally, the teleports of the network (that connects the satellite feeder links), are also capable of supporting link bonding.

In one embodiment, the VSAT antenna comprises a toroidal reflector having multiple feeds, such that the multiple feeds align with the segment of track in the sky that the satellites are following. With regard to any single satellite, the VSAT can be configured to switch feeds sequentially to track a particular satellite. Two or more satellites can be tracked straightforwardly using the same process but using multiple feeds simultaneously.

In general, link bonding involves splitting data flows across two or more data channels, and is used in combination with a particular constellation type (repeating ground track) and VSAT antenna type (single-degree of freedom tracking, in this case, a toroidal reflector) that support link bonding in a practical manner.

Link bonding is advantageous to provide load balancing on the uplink and separately on the downlink, which improves the multiplexing efficiency of the network and therefore its overall capacity. Link bonding also provides diversity dynamically, such that if one link is momentarily interrupted (due to weather, interference, physical obscuration, etc.), the other link is already established and open and able to continue carrying traffic.

The radio spectrum that is in use, is shared between multiple operators, including operators of GEO satellites. Thus, situations can occur that from a particular VSAT location, a GEO satellite may be located on the apparent path of satellites of the constellation(s) described. Depending on the precise coverage areas and frequency allocations, the uplink from the VSAT might be directed at and interfere with the GEO satellite. Equally, it can be that the downlink from the GEO satellite will block the VSAT from receiving the desired signal from the serving satellite as the serving satellite appears to cross in front of the GEO satellite. Under these circumstances, link bonding allows communication with one of the serving satellites to be disabled for some tens of seconds while the alignment persists, and during this time all the communication is routed via a different satellite. In some embodiments, more than one of the multiple satellite links can be disabled simultaneously when an antenna can still maintain communications with one of the satellites. Thus, if there is a sufficient number of available serving satellites, individual links that may cause interference may be disabled for short periods of time.

A similar problem can arise with regard to interference toward and from other satellite operators in non-GEO orbits. Dynamic de-activation of links is implemented in a similar way to the GEO satellite situation described above and the use of link bonding provides a similar seamless avoidance of the temporary blockage that is being imposed.

The same re-routing could be achieved by high-level satellite resource switching and re-allocation but the advantage of using link bonding for this purpose is that the link bonding algorithms work at a low level in the system (typically Layer 2). The switching and re-routing are fast and automatic in response to link interruption and only a minimal load is placed on higher-level link control.

In addition to link bonding, in the communications systems disclosed herein, the satellites may each project a contiguous pattern of spot beams onto the surface of the Earth. The spot beams, when active, provide bidirectional communication on the service link—the connection between the satellite and the VSAT. Many VSATs are served with a single spot beam.

In one embodiment, the direction of the spot beams is fixed relative to the orientation of the satellite, so that the spot beams sweep across the surface of the Earth with the motion of the satellite. It is possible also to maneuver the attitude of the satellite so that the pattern of spots remains somewhat fixed on a particular region for a limited period before being shifted to another region.

Where multiple active spot beams abut in a service area, they can be assigned separate frequency bands (within the overall spectrum allocation for the service) so that the interference between adjacent, and near-neighboring spot beams is minimized. Particular frequencies are re-used multiple times within the spot pattern and from one satellite to the next.

Areas of service on the ground are predefined and within these areas, customer service is offered, and VSATs will be able to operate. Generally speaking, these are more populous locales such as major cities and conurbations. The spot beams are switched on or off according to whether they are pointed at an active service area or not; by turning a spot beam off, power aboard the satellite is conserved and this, in turn, reduces the weight of the solar panels and heat dissipation hardware that are needed and therefore the launch cost of the satellite.

Figure 3:
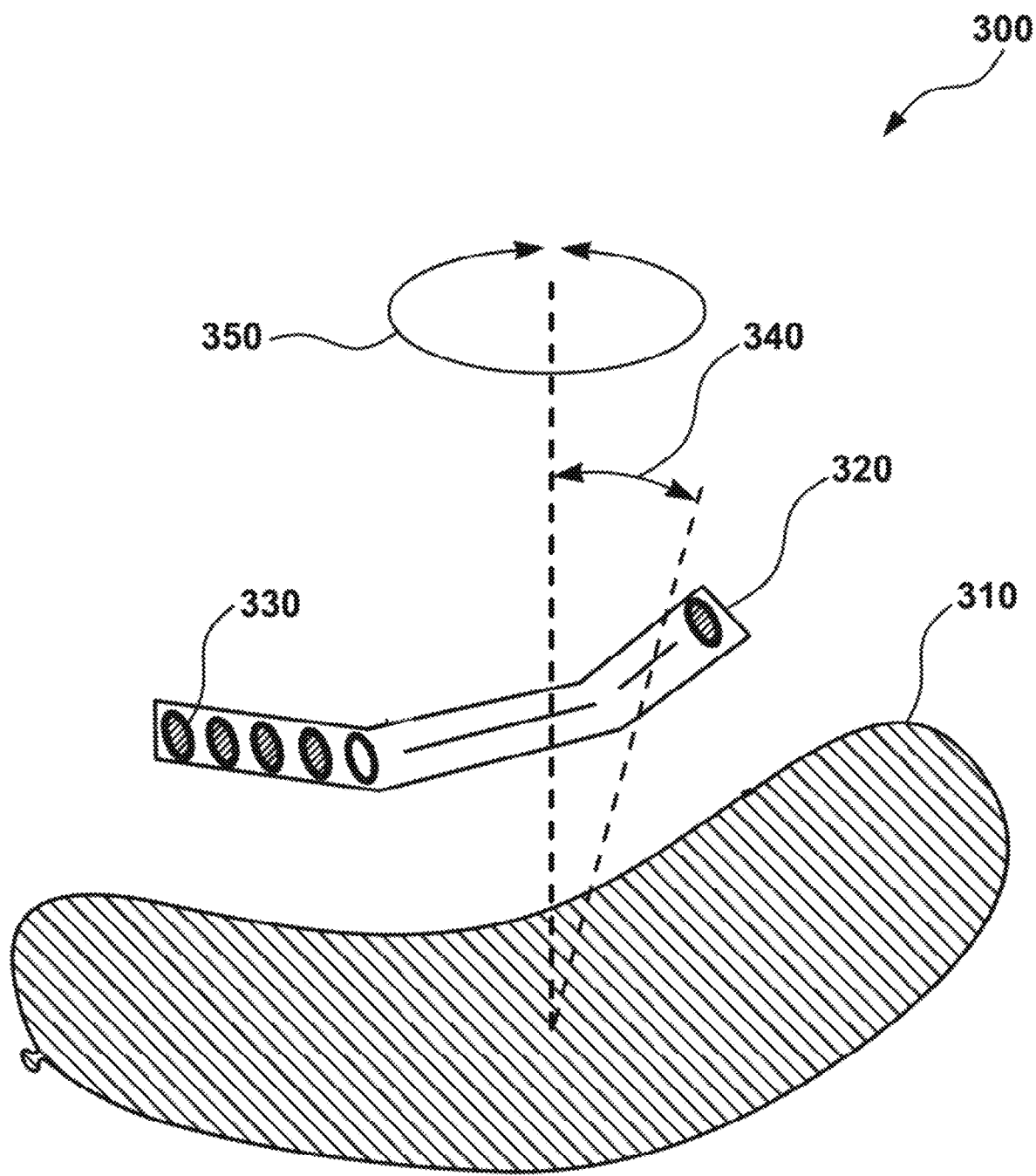
FIG. 3 illustrates a schematic view of a very small aperture terminal (VSAT) including a toroidal antenna having a single degree of freedom in its tracking capability, according to various embodiments of the present technology.

FIG. 3 is a diagram 300 of the antenna that is incorporated in the very small aperture terminal (VSAT) according to various embodiments of the present technology. The antenna 310 illustrated is a type known as a "toroidal antenna", the important feature of which is that the antenna's long axis can be aligned parallel to the chosen track segment in the sky and the antenna suitably rotated about its long axis, so that the focus of the RF energy that is radiated from the satellites that are in motion along the track segment falls on the focal plane strip 320 of the antenna (aslo referred to as focal strip element 320). The toroidal antenna 310 is sufficiently long to be able to communicate anywhere along an arc of perhaps 120 degrees of the track in the sky that is of interest, depending on the implementation requirements. For each of the satellites that is being tracked, a concentration of received energy is focused onto a different focal strip element 330 (also referred to as array elements 330 or strip elements 330). As a given satellite moves in the sky, the point of focus on the focal plane strip 320 moves accordingly. For each satellite, the antenna tracking process involves switching between the focal strip elements 330 as the point of focus moves linearly along the focal plane strip 320. The antenna is able to track multiple satellites because the satellites are separated in their apparent angle as seen from the ground and their points of focus are separated on the focal plane strip 320 and thus the antenna is able separately to communicate with the different satellites by activating different focal strip elements 330. The transmit direction works in an exactly similar way, with multiple elements (e.g., array elements 330) actively transmitting and targeting their beams each at a different satellite.

It is desirable to maintain a smooth transition, as the energy focus from a given satellite moves between one focal strip element 320 and its neighbor. For this reason, in various embodiments, neighboring focal strip elements 320 may be dynamically combined, both longitudinally in the direction of motion of the satellite's energy focus and laterally if a second (or third etc.) line of focal strip elements 320 is used give some lateral tolerance in the satellites' apparent positions. In some embodiments, the strip elements 330 can be arranged to provide single axis tracking, while in other embodiments, the strip elements 330 can be configured to track in more than one axis to compensate for instances where slight discrepancies exist in relation to the ground tracks of the satellites. Thus, the strip elements 330 can provide lateral "wiggle room" in some embodiments. The multiple antenna elements allow steering variability so that the antenna can laterally deviate from the single axis to track the first satellites and transmit or receive data on the link.

In various embodiments, upon installation, the elevation angle 340 and the azimuth angle 350 are adjusted so that the antenna is aligned with the designated satellite path (e.g., the first satellite sky track segment 110 or the second satellite sky track segment 112). After installation, the elevation angle 340 and the azimuth angle 350 do not require further adjustment because the apparent satellite track segment in the sky (e.g., the first satellite sky track segment 110 or the second satellite sky track segment 112) is fixed in the sky. The only tracking that is applied is to follow the individual satellites as they move along the path (e.g., the first satellite sky track segment 110 or the second sky track segment 112), which is accomplished by switching between the array elements 330.

In various embodiments, the electronic combination of the signals to and from multiple satellites along the same sky track segment is typically described as satellite link bonding. The possibility of satellite link bonding between multiple satellite connections allows for the typical advantages of a link-bonded radio system including the following. First link diversity, makes the connection less susceptible to interference. Second, increased capacity by the addition of the capacities of the two or more links involved. Third, load balancing between links from the point of view of the limited capacity of the satellites and the feeder links.

In various embodiments, an advantage of the systems and methods of the present technology is the reduction in the cost of the VSAT, by a factor of five or ten compared with an electronically scanned array type that has two degrees of freedom. When millions of VSATs are deployed, the added satellite cost (principally the station-keeping) is amply justified. In the case of electronically steered antennas, the cost scales, to a first order, with the number of active elements. If a linear VSAT antenna covers a 100-degree scan angle with one-degree resolution (for example) it will need 100 active elements. A VSAT having similar angular coverage and similar resolution, across two dimensions, will need an active element count of approximately $(100/2)^2 \cdot \pi = 2500$, (i.e., about 25 times greater cost in the active electronics).

In some embodiments, a secondary cost advantage is that the ongoing electricity consumption of the VSAT antenna is greatly reduced, by having a small handful of array elements "lit" at any given time. By contrast, a two-dimensional (i.e., planar) phased array VSAT antenna may have thousands of elements lit simultaneously, requiring hundreds of Watts of power consumption, during both the daytime and nighttime. Moreover, a less obvious benefit is that mobility management is greatly simplified. In other words, it is easier to calculate which direction the VSAT antenna needs to point in, and the question of which satellite is servicing which subscriber is also greatly simplified.

Figure 5A:
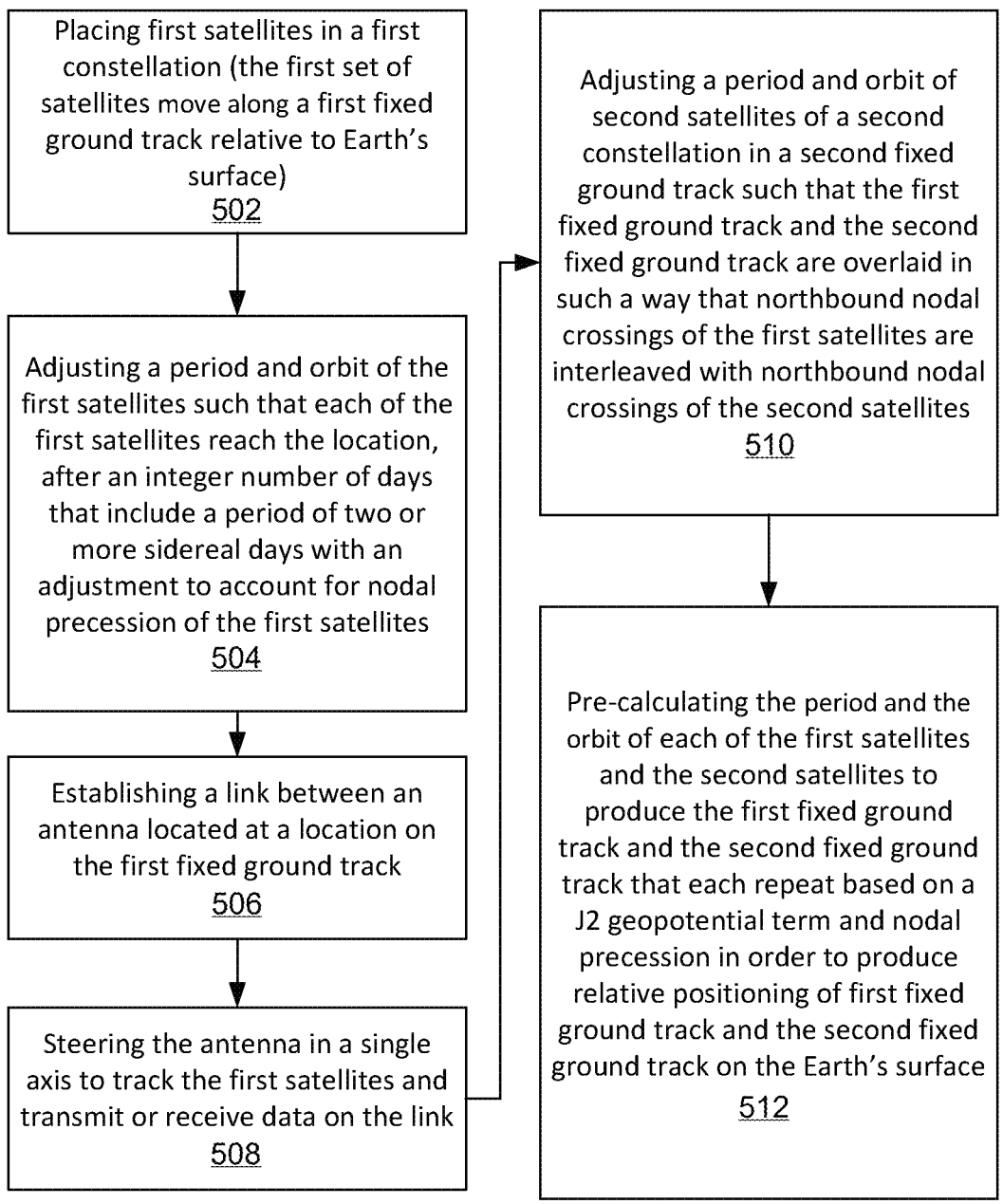
FIGS. 5A and 5B are collectively a flowchart of an example method of the present disclosure.
Figure 5B:
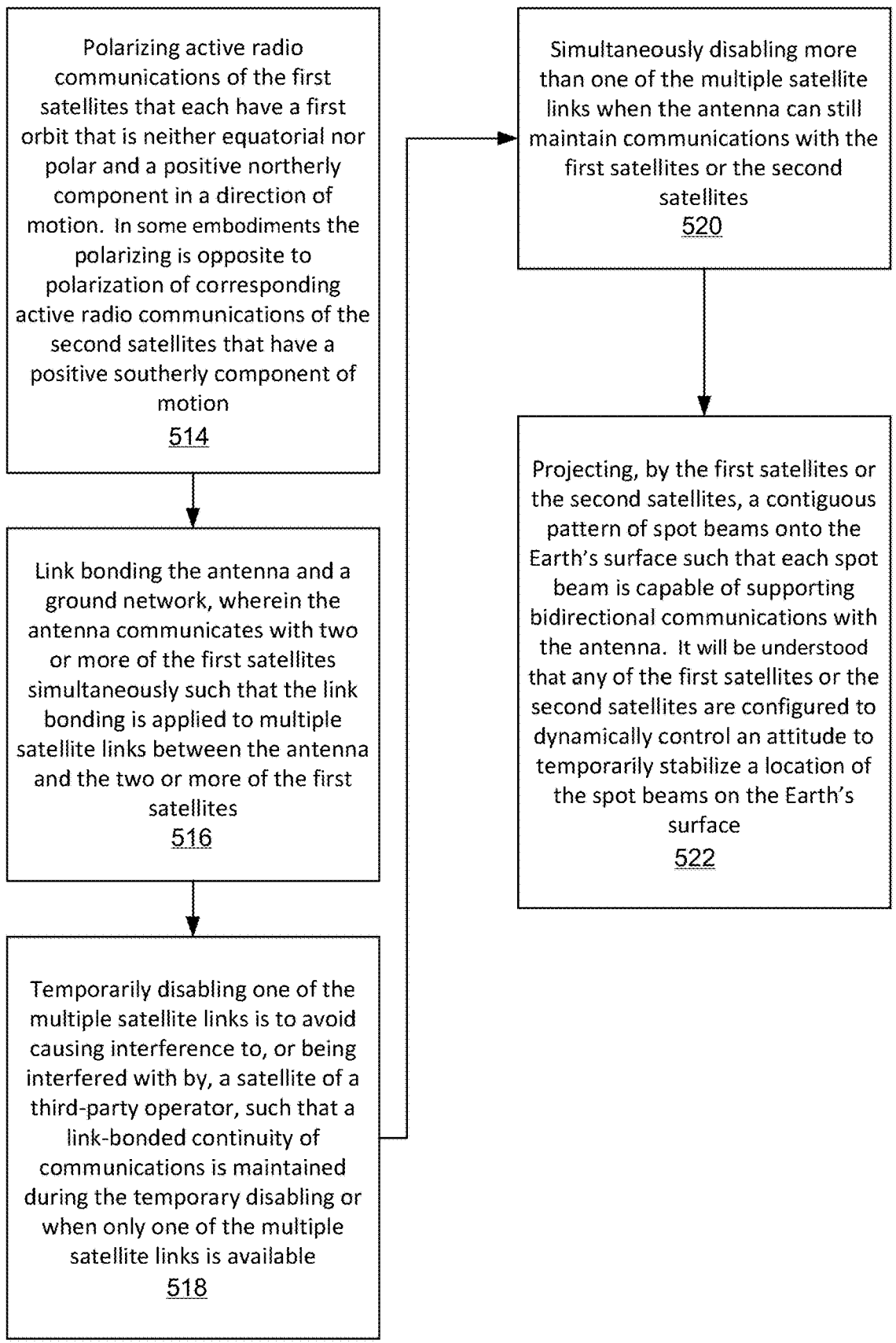

FIGS. 5A and 5B collective are a flowchart of an example method of the present disclosure. The method can include a step 502 of placing first satellites in a first constellation. In some instances, the first satellites move along a first fixed ground track relative to Earth's surface. In step 504, the method includes adjusting a period and orbit of the first satellites such that each of the first satellites reaches the location, after an integer number of days that include a period of two or more sidereal days with an adjustment to account for nodal precession of the first satellites. In sum, step 504 adjusts a period or orbit of the satellites to account for J2 term perturbations due to the oblateness of the Earth.

Next, the method includes a step 506 of establishing a link between an antenna located at a location on the first fixed ground track, as well as a step 508 of steering the antenna in a single axis to track the first satellites and transmit or receive data on the link.

The method can also include a step 510 of adjusting a period and orbit of second satellites of a second constellation in a second fixed ground track such that the first fixed ground track and the second fixed ground track are overlaid in such a way that northbound nodal crossings of the first satellites are interleaved with northbound nodal crossings of the second satellites.

In some embodiments, the method includes a step 512 of pre-calculating the period and the orbit of each of the first satellites and the second satellites to produce the first fixed ground track and the second fixed ground track that each repeat based on a J2 geopotential term and nodal precession in order to produce relative positioning of first fixed ground track and the second fixed ground track on the Earth's surface.

In various embodiments, the method can include a step 514 of polarizing active radio communications of the first satellites that each have a first orbit that is neither equatorial nor polar and a positive northerly component in a direction of motion. In some embodiments, the polarizing is the opposite of polarization of corresponding active radio communications of the second satellites that have a positive southerly component of motion.

In step 516, the method includes link bonding between the antenna and a ground network, wherein the antenna communicates with two or more of the first satellites simultaneously such that the link bonding is applied to multiple satellite links between the antenna and the two or more of the first satellites.

In step 518, the method can include temporarily disabling one of the multiple satellite links is to avoid causing interference to, or being interfered with by, a satellite of a third-party operator, such that a link-bonded continuity of communications is maintained during the temporary disabling or when only one of the multiple satellite links is available. The method can also include a step 520 of simultaneously disabling more than one of the multiple satellite links when the antenna can still maintain communications with the first satellites or the second satellites.

In step 522, the method can include projecting, by the first satellites or the second satellites, a contiguous pattern of spot beams onto the Earth's surface such that each spot beam is capable of supporting bidirectional communications with the antenna. It will be understood that and the first satellites or the second satellites are configured to dynamically control an attitude to temporarily stabilize a location of the spot beams on the Earth's surface. In some embodiments, a range of operating frequencies of each of the spot beams is restricted so as to avoid creating interference between neighboring or near neighboring spot beams.

Figure 6:
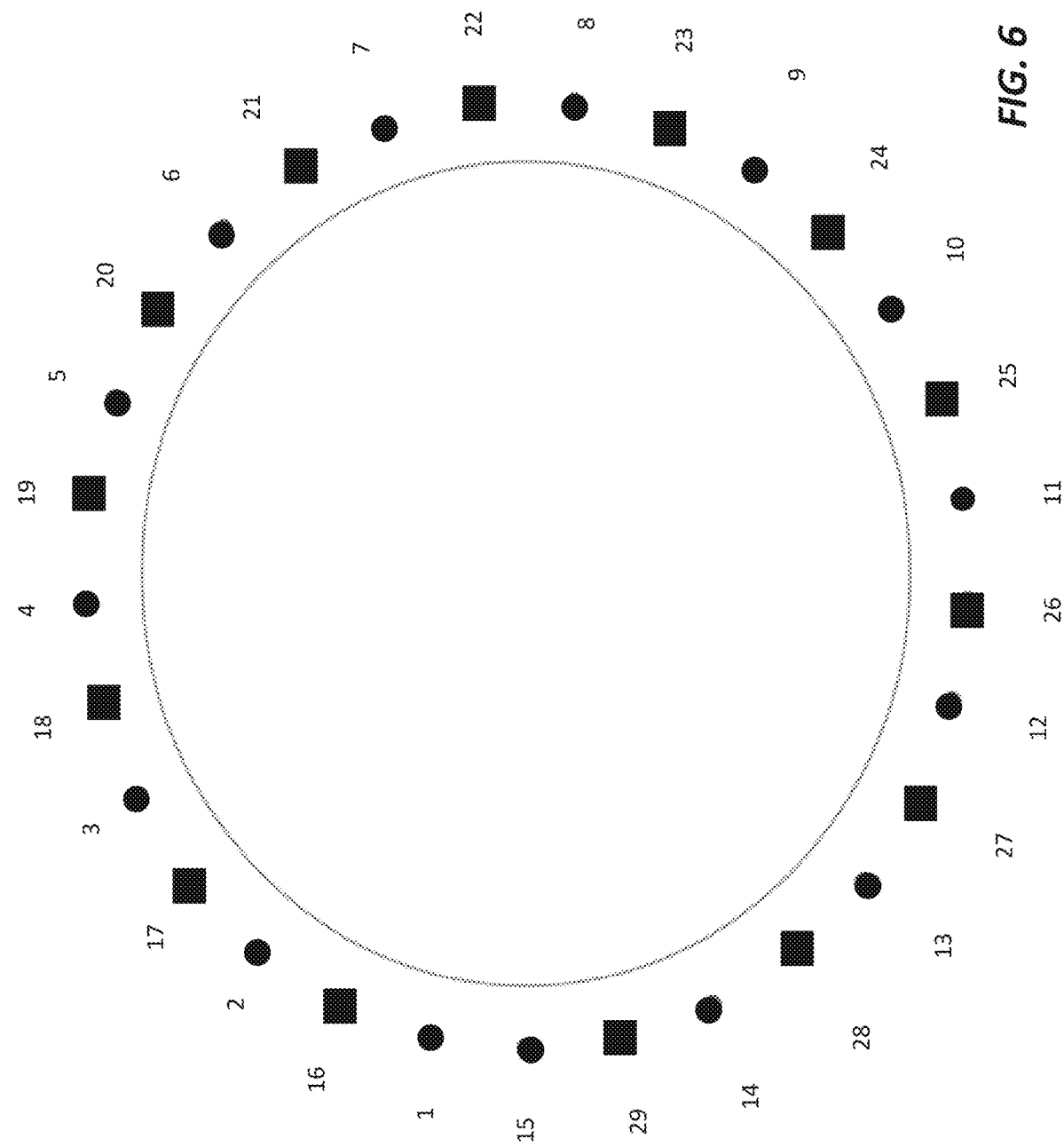
FIG. 6 diagrammatically depicts the Earth, together with the satellites, in the Earth-fixed frame.

FIG. 6 diagrammatically depicts the Earth, together with the satellites, in the Earth-fixed frame. The diagram is taken as a slice in the Equatorial plane, seen from the North. The icons are the points at which the satellites cross the Equatorial plane in the northbound direction (the ascending node). The arrangement shown is for a trajectory that repeats after 29 orbits (n=29) over a period of 2 days (m=2).

The crossing points are numbered in sequence, and all of the circle icons correspond to orbits that occur during the first day. It will be noted that the crossing point #15 is positioned one half step (counting a "step" as the distance between crossing points of successive orbits) before the original crossing point #1. Then during the second day, the subsequent crossing points (now shown as square icons) are positioned halfway between those of the previous day. Eventually crossing point #29 is made, and this is one step short of crossing point #30, so that the next crossing point after that coincides exactly with the first crossing point, #1. All the subsequent crossing points coincide with those from two days previously and the ground track is repeating.

The "day" described here is not exactly a sidereal day because the constellation is precessing, this point being covered more accurately in the section describing the math of the orbital mechanics. While the figure illustrates an n/m relationship of 29/2, it can be seen that the same principle will hold good for any integer ratio of orbits and days.

While this technology is susceptible of embodiments in many different forms, there is shown in the drawings and has been described in detail several specific embodiments with the understanding that the present disclosure is to be considered as an exemplification of the principles of the present technology and is not intended to limit the present technology to the embodiments illustrated.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer, or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the present technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the present technology as defined by the appended claims and otherwise appreciated by one of ordinary skill in the art. The scope of the present technology should, therefore, be determined not with reference to the above description, but instead should be determined with reference to the appended claims along with their full scope of equivalents.

What is claimed is:

1. A system comprising:
   first satellites in a first constellation, the first satellites each having a first fixed ground track relative to Earth's surface, wherein an orbit of the first satellites having been determined such that the first fixed ground track remains fixed relative to a location on the Earth's surface, taking account of a J2-induced nodal precession, the orbit of the first satellites taking a form of integer n orbits reaching a same nadir point over the surface of the Earth after integer m rotations of Earth; and
   a VSAT having an antenna in a location designated by a service operator as being in a service region, wherein a segment of sky track that corresponds to an orbital trajectory that is above the first fixed ground track is visible, the antenna being configured to steer in a single axis to track the first satellites as they move along the segment of the sky track.

2. The system according to claim 1, further comprising a second constellation comprising second satellites, the second constellation having similar orbital parameters to the first constellation but with shifted right ascensions so as to create a set of ground tracks that interleave with those of the first constellation and thereby reduce a separation of the set of ground tracks of a two-constellation combination.

3. The system according to claim 2, wherein a period and the orbit of each of the first satellites and the second satellites are precalculated to produce the first fixed ground track and a second fixed ground track that each repeat based on the J2-induced nodal precession in order to produce relative positioning of the first fixed ground track and the second fixed ground track on the Earth's surface.

4. The system according to claim 3, wherein the first satellites each have an orbit that is neither equatorial nor polar and whose radiocommunications signal polarizations are arranged so as to emit in one polarization in a part of an orbital cycle that has a Northbound component of motion and in an opposite polarization in a part of the orbital cycle that has a Southbound component of motion.

5. The system according to claim 4, wherein the first satellites use a similar reversal of receiver polarizations on the part of the orbital cycle that contains the Northbound component of motion compared with the part of the orbital cycle that contains the Southbound component of motion.

6. The system according to claim 1, wherein the antenna and a ground network associated are configured to use link bonding, wherein the antenna communicates with two or more of the first satellites simultaneously such that the link bonding is applied to multiple satellite links between the antenna and the two or more of the first satellites.

7. The system according to claim 6, wherein one of the multiple satellite links is temporarily disabled to avoid causing interference to, or being interfered with by, a satellite of a third-party operator, such that a link-bonded continuity of communications is maintained during the temporary disabling or when only one of the multiple satellite links is available.

8. The system according to claim 6, wherein more than one of the multiple satellite links is disabled simultaneously when the antenna can still maintain communications with the first satellites or second satellites of a second constellation.

9. The system according to claim 8, wherein the first satellites or the second satellites can be configured to project a contiguous pattern of spot beams onto the Earth's surface.

10. The system according to claim 9, wherein each spot beam is capable of supporting bidirectional communications with the antenna.

11. The system according to claim 10, wherein any of the first satellites or the second satellites are configured to dynamically control an attitude to temporarily stabilize a location of the spot beams on the Earth's surface.

12. The system according to claim 11, wherein a range of operating frequencies of each of the spot beams is restricted so as to avoid creating interference between neighboring or near neighboring spot beams.

13. A method comprising:
    placing first satellites in a first constellation, the first satellites each having a first fixed ground track relative to Earth's surface;
    setting a period and an orbit of the first satellites such that each of the first satellites repeatedly follows a same ground track over an integer number of orbits in approximately an integer number of days, such that a precise time of a repeat pattern has been adjusted to account for the nodal precession;
    establishing a link between an antenna located at a location associated with the first fixed ground track; and
    steering the antenna in a single axis to track the first satellites and transmit or receive data on a link.

14. The method according to claim 13, further comprising adjusting a period and orbit of second satellites of a second constellation in a second fixed ground track such that the first fixed ground track and the second fixed ground track are overlaid in such a way that northbound nodal crossings of the first satellites are interleaved with northbound nodal crossings of the second satellites.

15. The method according to claim 14, wherein the first satellites each have an orbit that is neither equatorial nor polar and whose radiocommunications signal polarizations are arranged so as to emit in one polarization in a part of an orbital cycle that has a Northbound component of motion and in an opposite polarization in a part of the orbital cycle that has a Southbound component of motion and use a similar reversal of receiver polarizations on the part of the orbital cycle that contains the Northbound component of motion compared with the part of the orbital cycle that contains the Southbound component of motion.

16. The method according to claim 15, further comprising link bonding the antenna and a ground network, wherein the antenna communicates with two or more of the first satellites simultaneously such that the link bonding is applied to multiple satellite links between the antenna and the two or more of the first satellites.

17. The method according to claim 16, further comprising: temporarily disabling one of the multiple satellite links is to avoid causing interference to, or being interfered with, by a satellite of a third-party operator, such that a link-bonded continuity of communications is maintained during the temporary disabling or when only one of the multiple satellite links is available; and simultaneously disabling more than one of the multiple satellite links when the antenna can still maintain communications with the first satellites or the second satellites.

18. The method according to claim 13, further comprising projecting, by the first satellites or second satellites of a second constellation, a contiguous pattern of spot beams onto the Earth's surface such that each spot beam is capable of supporting bidirectional communications with the antenna, wherein any of the first satellites or the second satellites are configured to dynamically control an attitude to temporarily stabilize a location of the spot beams on the Earth's surface, and further wherein a range of operating frequencies of each of the spot beams is restricted so as to avoid creating interference between neighboring or near neighboring spot beams.

19. The method according to claim 13, further comprising allowing steering variability so that the antenna deviates from the single axis to track the first satellites and transmit or receive data on the link, the steering variability being provided by multiple active antenna elements.

* * * * *